(12) United States Patent  
Korcz et al.

(10) Patent No.: US 9,035,175 B2
(45) Date of Patent: May 19, 2015

(54) MULTI-GANG ADJUSTABLE ELECTRICAL BOX

(71) Applicants: Krzysztof W. Korcz, Grainger, IN (US); Mahran H. Ayrton, South Bend, IN (US)

(72) Inventors: Krzysztof W. Korcz, Grainger, IN (US); Mahran H. Ayrton, South Bend, IN (US)

(73) Assignee: HUBBELL INCORPORATED, Shelton, CT (US)

( * ) Notice: Subject to any disclaimer, the term of this patent is extended or adjusted under 35 U.S.C. 154(b) by 171 days.

(21) Appl. No.: 13/632,699

(22) Filed: Oct. 1, 2012

(65) Prior Publication Data
US 2014/0090863 A1    Apr. 3, 2014

(51) Int. Cl.
*H02G 3/08*      (2006.01)
(52) U.S. Cl.
CPC ............. *H02G 3/086* (2013.01); *Y10S 248/906* (2013.01)
(58) Field of Classification Search
USPC ....... 174/50, 58; 439/535; 248/906; 220/4.02
See application file for complete search history.

(56) References Cited

U.S. PATENT DOCUMENTS

| 2,092,367 | A |   | 9/1937 | Breitenstein |
| 3,587,906 | A | * | 6/1971 | William Pepe ................ 220/3.2 |
| 5,594,207 | A | * | 1/1997 | Fabian et al. .................... 174/58 |
| 6,872,884 | B2 |  | 3/2005 | Roesch et al. |
| 6,894,222 | B2 |  | 5/2005 | Lalancette et al. |
| 7,119,277 | B1 |  | 10/2006 | Shotey et al. |
| 7,186,915 | B2 |  | 3/2007 | Hull et al. |
| 7,575,122 | B2 |  | 8/2009 | Hull et al. |
| 7,628,286 | B2 |  | 12/2009 | Lalancette |
| 2010/0288554 | A1 |  | 11/2010 | Jafari |

* cited by examiner

*Primary Examiner* — Dhirubhai R Patel
(74) *Attorney, Agent, or Firm* — Roylance, Abrams, Berdo & Goodman, L.L.P.

(57) ABSTRACT

An electrical box assembly includes an electrical box having a removable partition plate that can be positioned between the ends of the electrical box or at the end of the electrical box when two or more of the electrical boxes are ganged together. The electrical box can include a mounting bracket having a body portion attached to a wall of the box for supporting the box during use. A support member is coupled to the mounting bracket and is extendable to a length to contact the opposing wall. The mounting and the support member are independently adjustable with respect to the box.

27 Claims, 9 Drawing Sheets

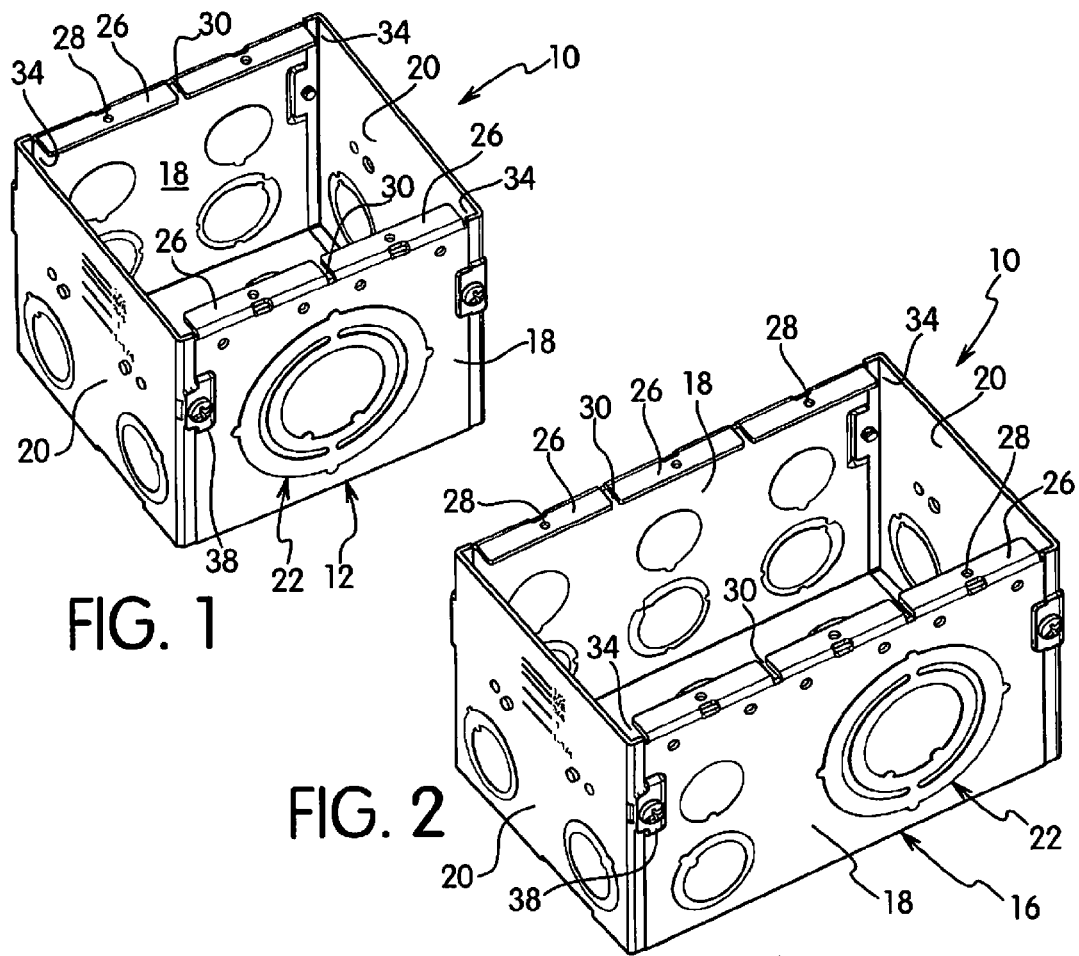
FIG. 1
FIG. 2
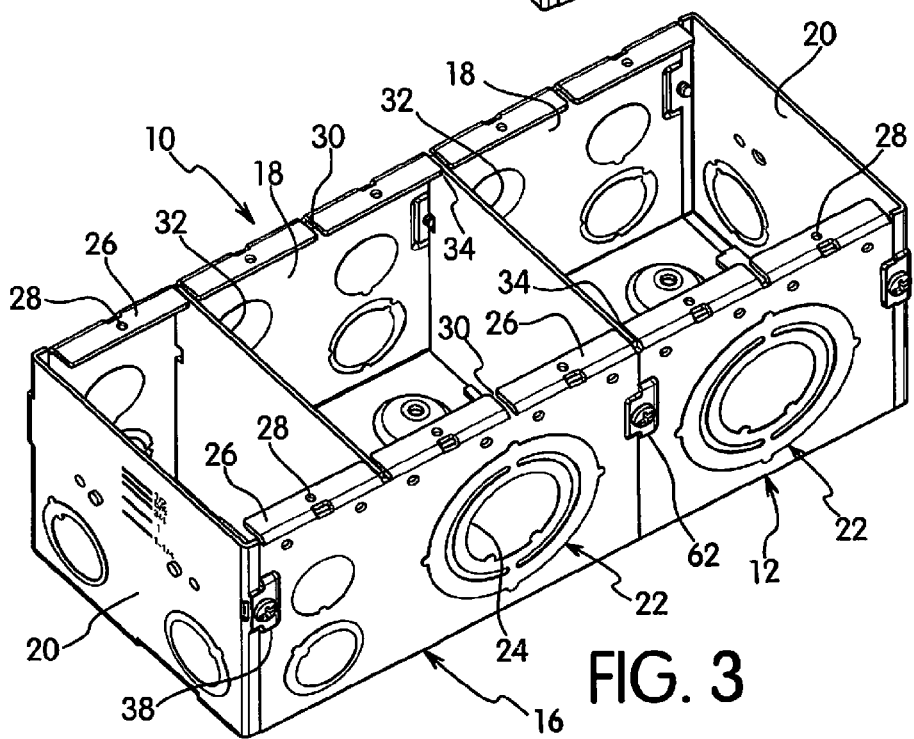
FIG. 3

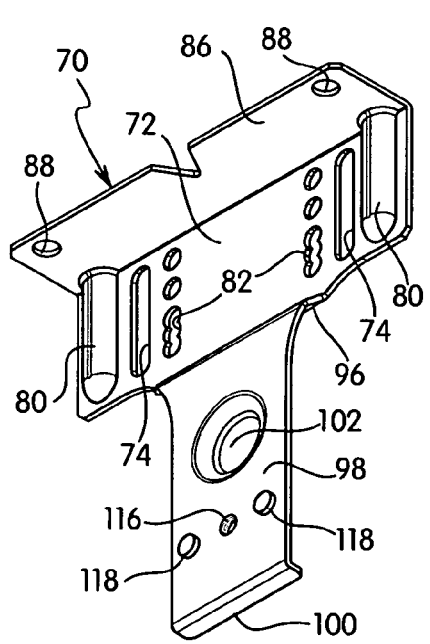
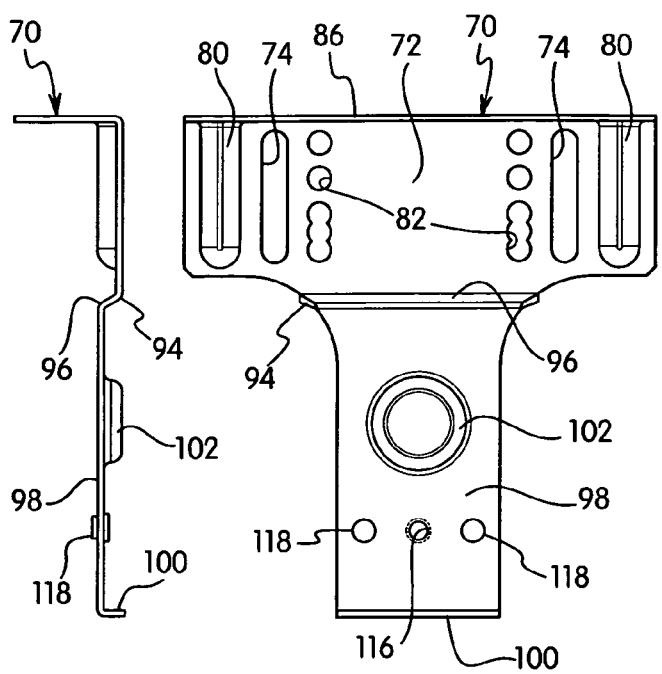
FIG. 8     FIG. 9     FIG. 10
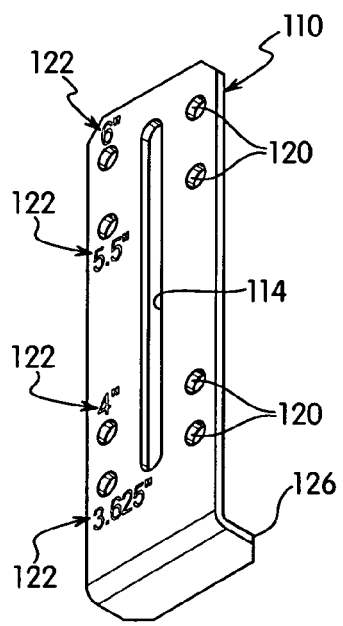
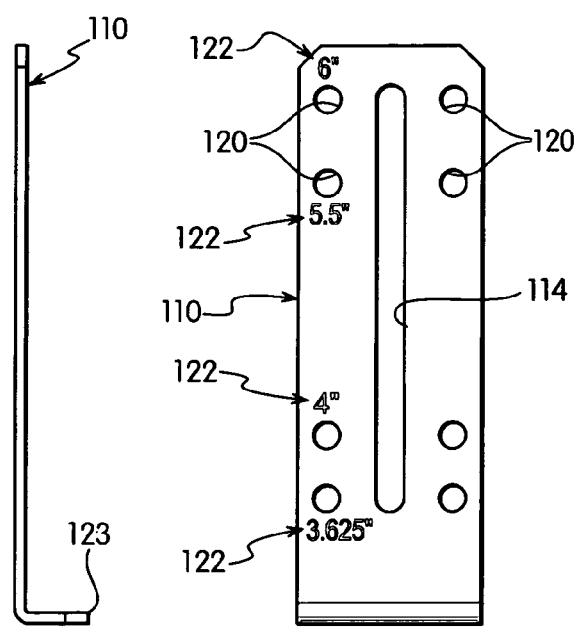
FIG. 11     FIG. 12     FIG. 13

MULTI-GANG ADJUSTABLE ELECTRICAL BOX

FIELD OF THE INVENTION

The present invention is directed to a gangable electrical box having a movable partition and a mounting bracket. The invention is further directed to an electrical box having an adjustable mounting bracket with a movable extension support member.

BACKGROUND OF THE INVENTION

Electrical boxes are required in many situations for supporting electrical wiring devices such as receptacles, switches and connectors. Many electrical boxes have removable end walls so that two or more electrical boxes can be ganged together.

Electrical boxes having supports for electrical boxes are often used for mounting the electrical box to a support such as a wall stud. Various support devices are also used that extend from the electrical box to contact an opposing wall to support one side of the electrical box.

One example of an electrical box is disclosed in U.S. Pat. No. 2,092,367 to Breitenstein. The outlet box has a movable partition plate having notches that fit in the bottom wall of the electrical box. The top end has tabs that fit within holes formed in a cover plate. An elongated tongue extends from the top end to project into the opening in the cover plate.

U.S. Pat. No. 6,872,884 to Roesch et al. discloses a gangable electrical unit. The unit is constructed for positioning an electrical component beside an electrical outlet box. The unit includes a bracket with a wall structure and an adhering element for mounting on a wall of the electrical outlet box.

U.S. Pat. No. 6,894,222 to Lalancette et al. discloses an outlet box having an outwardly extending flange for mounting the electrical box and a plurality of knock-outs in the side walls. Outwardly extending flanges project from opposite side walls. Fastening members integrally formed with the flanges mount the box to a structural member.

U.S. Pat. No. 7,119,277 to Shotey et al. discloses an electrical device cover having a plurality of knock-outs in the adapter plate where the knock-outs include concentric rings. The knock-outs can be selectively removed to form an opening with different sizes.

U.S. Pat. No. 7,186,915 to Hull et al. discloses an electrical box molded as a one-piece unit of plastic material having three connectors extending outwardly from each side wall for receiving different sizes of electrical non-metallic tubing. The internal corners of the box are occupied by bosses that extend the full height of the corners and have holes therein for receiving a fastener. Attachment ears extend outwardly from the box. An adapter is attached to a front surface of the box with attachment ears aligned with the box ears.

U.S. Pat. No. 7,575,122 to Hull et al. discloses an outlet box having a knock-out in a side wall of a plastic electrical box. The knock-out has a slot for receiving a screw driver to apply a knock-out force. The knock-outs include a plurality of eccentric circles formed in the side wall.

U.S. Pat. No. 7,628,286 to Lalancette discloses an electrical box having a box locator adjustably positioned on one of the side walls to adjust the location of the front face of the box with respect to the stud to which the box is mounted. An opposite side wall includes a support bracket that is adjustably attached to the electrical box for supporting the electrical box with respect to a back wall.

U.S. Patent Publication No. 2010/0288554 to Jafari disclose an adjustable support bracket for an electrical box. The bracket includes two or three components incorporating a ratchet or locking mechanism to provide incremental adjustment of the support. The extendable arms include a spring loaded tab to engage a notch in the opposing extendable arm.

While the prior electrical boxes have generally been suitable for their intended use, there is a continuing need in the industry for improved electrical boxes.

SUMMARY OF THE INVENTION

The present invention is directed to an electrical box having a partition member for dividing the electrical box into separate compartments. The invention is also directed to a gangable electrical box having a divider plate and oversized knockouts to accommodate various electrical connections.

The present invention is further directed to a gangable electrical box having an adjustable mounting member for positioning the electrical box at a selected distance from a support and where the mounting member has an adjustable support that can extend from the support member.

Accordingly, one object of the invention is to provide a gangable electrical box where the electrical box has a removable partition plate that can be positioned in various locations. The electrical box can be ganged to another box where the partition plate can be inserted at the juncture between the adjoining boxes after assembly.

A further feature of the invention is to provide a gangable electrical box that is easily adapted for accommodating various electrical wiring devices in different installations.

Another feature of the invention is to provide an electrical box with various sizes of knockouts to connect to different size conduits and connectors. The knockouts in the side wall of the electrical box can be different sizes and can vary from one side wall to another. The knockouts can be as large as two inches. In one embodiment, the knockouts can be formed as concentric rings that can be selectively removed to provide the size opening for the intended connector.

Still another feature of the invention is to provide an electrical box having a removable and adjustable mounting member for mounting the electrical box to a support such as a wall stud. The support member is attached to the electrical box and is adjustable to position the open end of the electrical box at the wall surface. The position of the mounting bracket is selected depending on the thickness of the wall. The mounting bracket typically has a length to extend beyond the rear wall of the box to contact the opposing wall. The electrical box can have a mounting bracket on opposite sides of the box where one mounting bracket is positioned to extend between the inner surfaces of the opposing walls to support one end of the box.

The mounting bracket in one embodiment of the invention has an extendable support member that can be adjusted to contact the surface of the opposing wall to support one end of the box.

These and other aspects of the invention are basically attained by providing an electrical box assembly comprising a gangable electrical box having a rear wall, opposing side wall, and removable end walls. Each of the opposing side walls has a plurality of inwardly extending flanges for supporting an electrical device. Each of the flanges are spaced from a respective end wall and are spaced apart a distance to receive a partition plate. At least one partition plate has a dimension to fit between adjacent flanges and between a flange and a respective end wall. The electrical box is gangable with another electrical box and the at least one partition plate is adapted to be received between a respective flange of the electrical boxes.

The various features of the invention are further attained by providing an electrical box assembly comprising a gangable electrical box having a rear wall, opposing side walls and opposing end walls. The opposing side walls have an inwardly extending flange adapted for supporting an electrical device. A mounting bracket has a body portion coupled to the electrical box. The mounting bracket has a flange extending outward from a top end of the body portion and a leg extending from a bottom end of the body portion a distance to contact an opposing wall surface. A support member is coupled to the leg and is slidably adjustable with respect to the mounting bracket.

Other features and aspects of the invention are also attained by providing an electrical box assembly comprising an electrical box including a rear wall, opposing side walls and opposing first and second end walls. A first mounting bracket has a body portion coupled to the first end wall. A second mounting bracket has a body portion coupled to the second end wall. Each of the mounting brackets has a leg extending from the body portion with a length for contacting an opposing wall surface, and a flange extending substantially perpendicular from the body portion. Each mounting bracket is independently adjustable with respect to the respective end wall. At least one support member is coupled to the leg of the first mounting bracket or second mounting bracket. The support member is slidably adjustable with respect to the mounting bracket to extend from the mounting bracket a distance to contact an opposing wall to support the electrical box.

These and other advantages and salient features of the invention will become apparent from the following detailed description of the invention which, taken in conjunction with the annexed drawings, disclose various embodiments of the invention.

BRIEF DESCRIPTION OF THE DRAWINGS

The following is a brief description of the drawings, in which:

FIG. 1 is a perspective view of a two gang electrical box in one embodiment of the invention;

FIG. 2 is a perspective view of a three gang electrical box according to the invention;

FIG. 3 is a perspective view of the electrical box showing the electrical boxes ganged together;

FIG. 8 is a perspective view of the mounting bracket;

FIG. 9 is a side view of the mounting bracket of FIG. 8;

FIG. 10 is a front view of the mounting bracket of FIG. 8;

FIG. 11 is a perspective view of the support member;

FIG. 12 is a side view of the support member;

FIG. 13 is a front view of the support member;

DETAILED DESCRIPTION OF THE INVENTION

Figure 4:
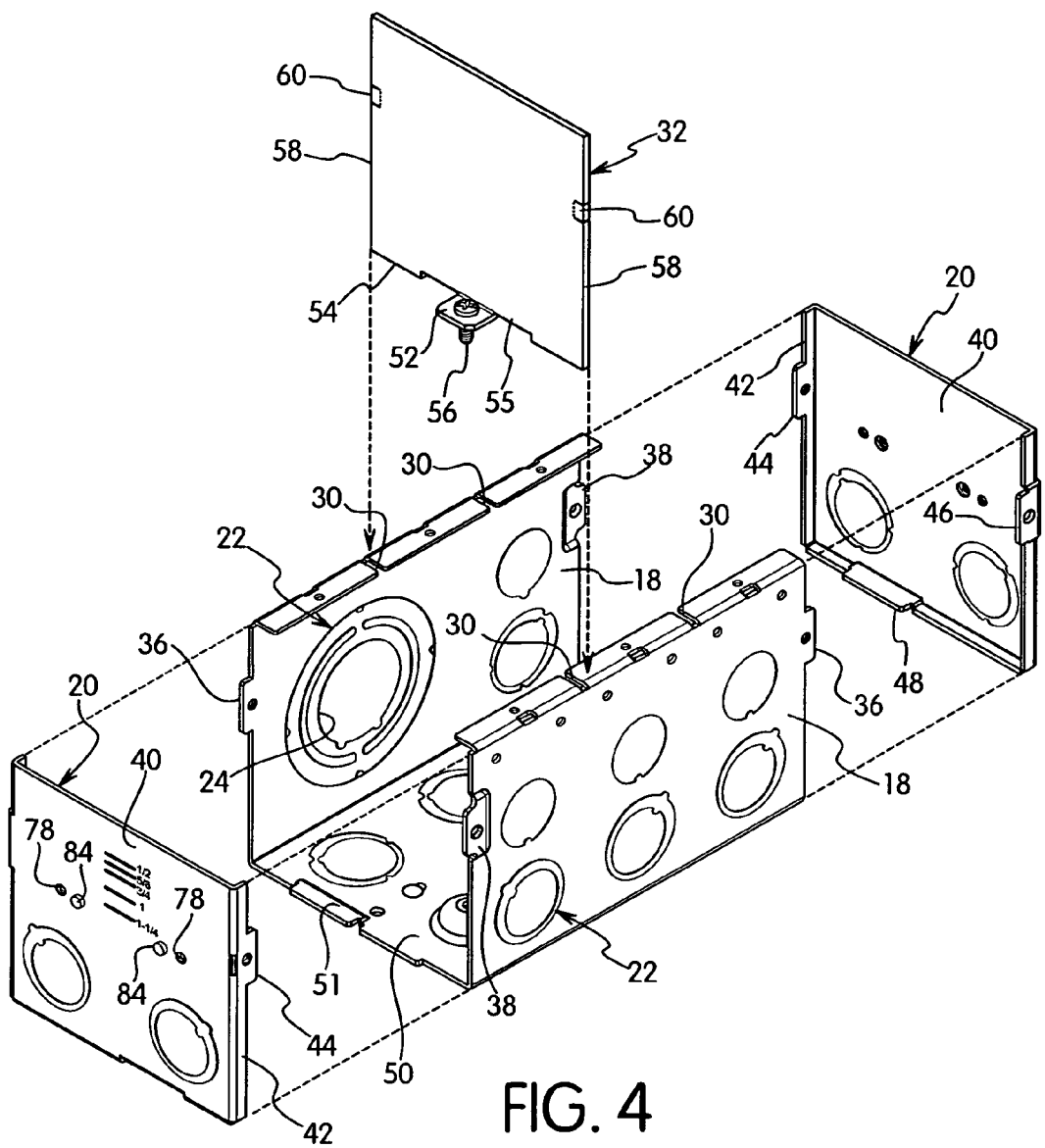
FIG. 4 is an exploded view of the electrical box of FIG. 2.

The present invention is directed to an electrical box assembly and to a mounting assembly for attaching and supporting the electrical box assembly to a support. The present invention is particularly directed to an electrical box having a removable partition plate and an adjustable mounting bracket. The electrical box assembly is adapted for mounting to a support such as a wall stud where the open end of the electrical box is positioned in a selected location with respect to the wall surface.

Referring to the drawings, the electrical box assembly 10 of the invention includes an electrical box 12 and a mounting bracket 14. The electrical box 12 can be a two gang electrical box as shown in FIG. 1 or a three gang electrical box 16 as shown in FIG. 2. The electrical box 12 and electrical box 16 can be ganged together as shown in FIG. 3.

Referring to FIG. 2, the electrical box 16 includes opposite side walls 18 and removable end walls 20. The side walls 18 include a plurality of knockouts 22 positioned to provide electrical connections to the box. In the embodiment shown in FIGS. 1 and 2, the knockouts can be concentric circles 24 to provide an opening as large as four inches as needed. The side wall 18 includes inwardly extending top flanges 26 for supporting an electrical wiring device. Each flange 26 includes a threaded aperture 28 for receiving a mounting screw. As shown in FIG. 2, each flange 26 is spaced apart to form a slot 30 for receiving a partition plate 32. Each top flange 26 is also spaced from the end walls 20 to form a slot 34.

Referring to FIG. 4, each end of the side walls include a first tab 36 extending in the plane of the side wall and a second tab 38 spaced from the respective side wall for coupling with the end wall. The end wall includes a planar surface 40 with a flange 42 extending around the side edges and the bottom edge. The side edges include a first tab 44 for mating with the flange 38 and a second tab 46 for mating with the tab 36. The bottom edge of the flange 42 has an inwardly spaced tab 48 for mating with the rear wall 50 of the box 16. The rear wall 50 includes a corresponding offset tab 51 for overlapping and mating with the flange 22 of the end wall 20 and the bottom wall 50 of a ganged electrical box. The end walls 20 and the top flange 26 are the same in the electrical box 12 of FIG. 1 and the electrical box 16 of FIG. 2, so that the same components are identified by the same reference numbers. The two gang electrical box 12 and the three gang electrical box 16 differ only the length of the side walls 18 and the rear wall 50.

The partition plate 32 has a planar configuration with a dimension to fit within the opening of the electrical box between the opposing side walls 18. A coupling flange 52 extends perpendicular from a bottom edge 54. A threaded screw 56 extends through an aperture in the flange 52 and is threaded into a hole in the rear wall 50 for attaching and fixing the location of the partition plate within the electrical box. As shown in FIG. 3, the partition plate is received within the slot 30 between adjacent top flanges 26. The partition plate has a height corresponding substantially to the height of the side walls so that the top edge of the partition plate is substantially flush with the top edge of the top flange 26. The top edge of the partition plate is stabilized within the slot 30 by the adjacent top flanges 26. As shown in FIG. 3, the partition plate 32 also fits within the slot 34 formed between the two adjacent ganged electrical boxes 12 and 16. The side edges 58 of the partition plate 32 include a removable tab 60 which can be removed when the partition plate 32 is positioned in the slot 34 to avoid interference with the screw 62 that is threaded through the coupling tabs 36 and 38 of the joined electrical boxes as shown in FIG. 3. The bottom edge 54 includes a central recess 55 for receiving the coupling tab 51 of the rear wall 50.

Figure 5:
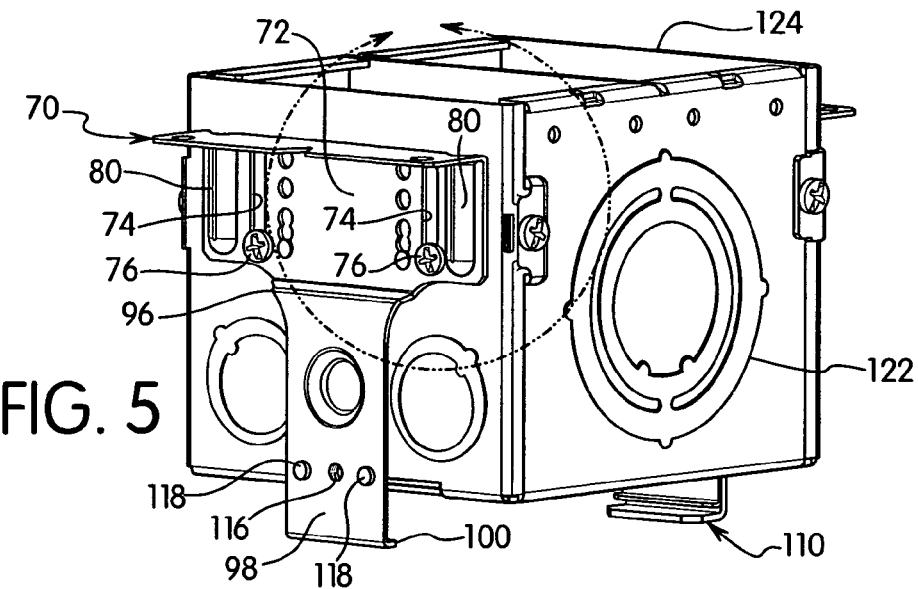
FIG. 5 is a perspective view of a first side of the electrical box of FIG. 1 showing the mounting bracket attached to one side of the electrical box.
Figure 6:
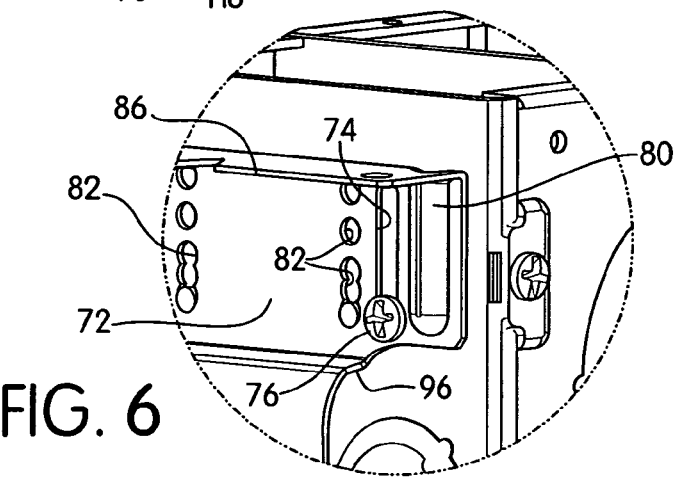
FIG. 6 is an enlarged view of the connecting assembly of the mounting bracket.
Figure 7:
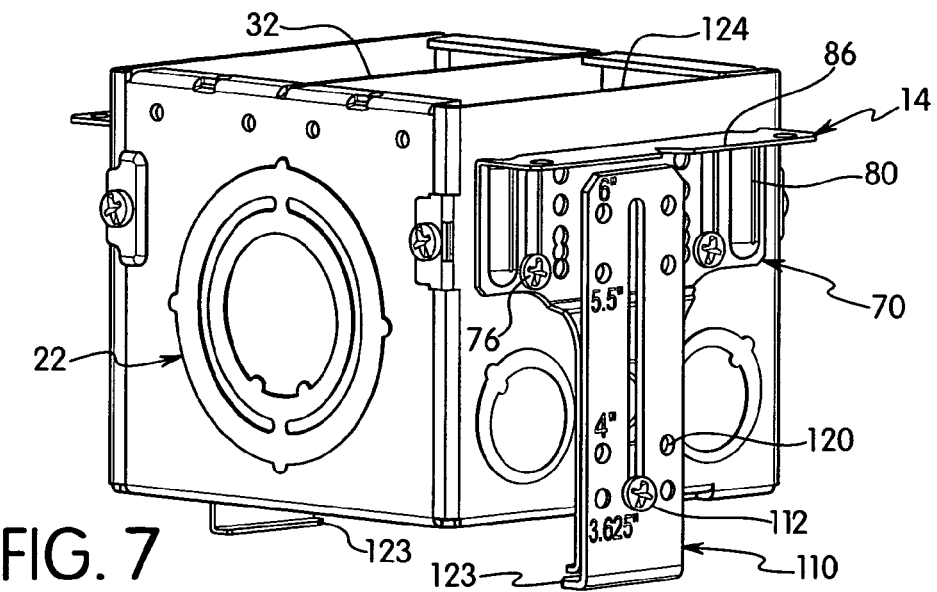
FIG. 7 is a perspective view of a second side of the electrical box showing the mounting bracket and the support member.

Each electrical box is adapted for receiving a mounting bracket 70 as shown in FIGS. 5-7. In FIGS. 5-7, the electrical box 12 is shown as a two gang box for purposes of illustration, although it will be understood that the mounting bracket 70 can also be attached to the electrical box 16 as shown in FIGS. 14-18. The end walls 20 are adapted for receiving the mounting bracket 70. The mounting bracket 70 has a main body portion 72 that is coupled directly to the end wall 20. The main body portion 72 has a pair of slots 74 extending in the longitudinal direction of the mounting bracket for receiving a respective coupling screw 76. Screw 76 extends through the respective slot and is threaded into an aperture 78 in the end wall 20 for adjusting the position of the mounting bracket 70 with respect to the end wall in a linear direction between the bottom wall 50 and the open top end of the electrical box. Two longitudinal extending strengthening ribs 80 are positioned parallel to the slots 74 for strengthening the main body portion and forming a contact surface of the bracket 70 against the support structure.

Figure 14:
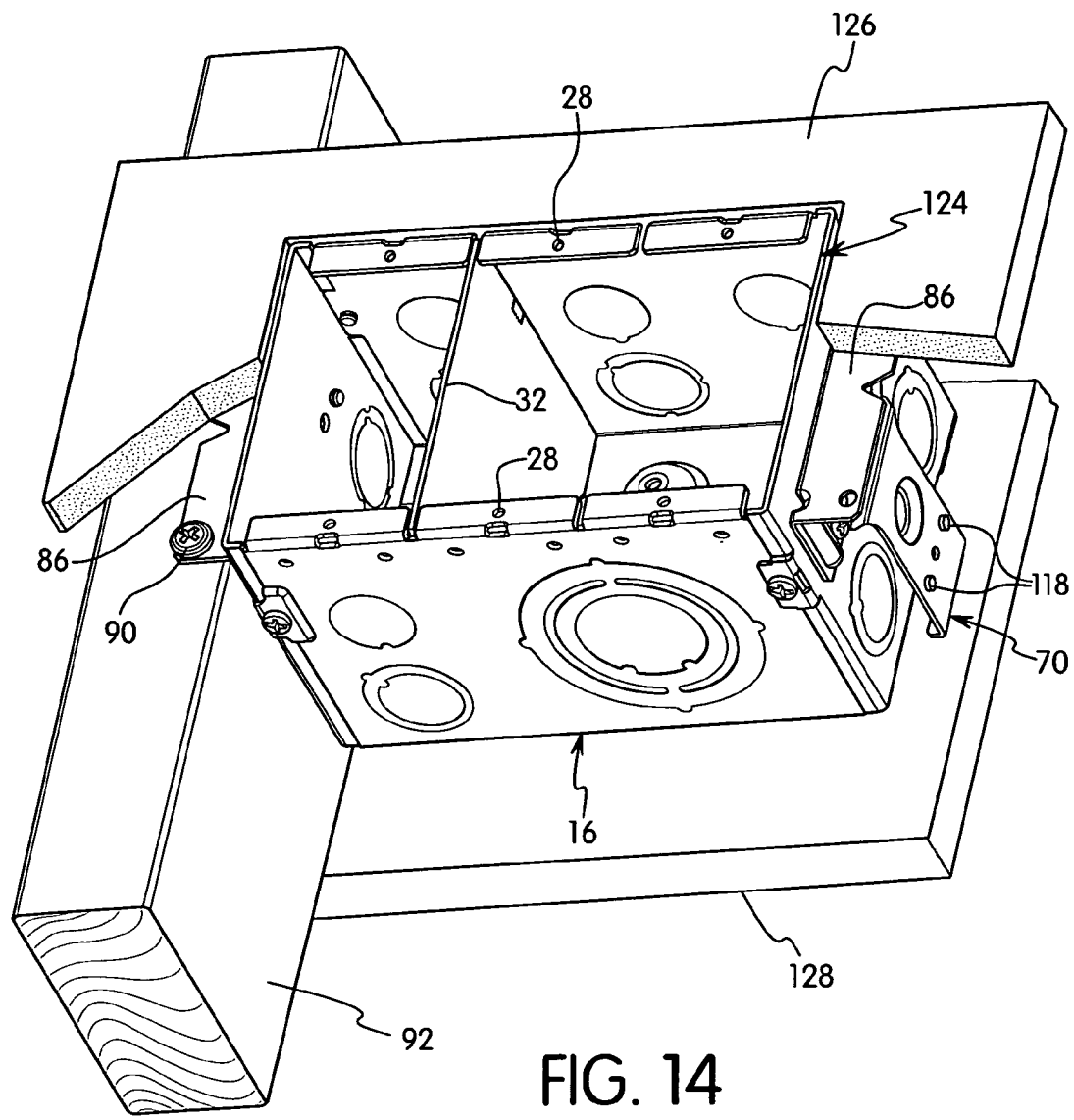
FIG. 14 is a perspective view of the electrical box attached to a support wall stud and a mounting bracket supporting one end of the electrical box.

A plurality of apertures or recesses 82 are provided for mating with a detent 84 in end wall 20 for positioning the mounting bracket 70 with respect to the side wall. The top edge of the main body portion 72 has an outwardly extending flange 86 having at least one aperture 88 for receiving a fastener 90 for mounting the electrical box assembly to a support such as a wall stud 92 as shown in FIG. 14.

The bottom edge 94 of the main body portion 72 includes an outwardly extending flange 96 that extends outwardly a distance corresponding substantially to the depth of the ribs 80 as shown in FIG. 9. A leg 98 extends downwardly from the flange 96 substantially parallel to the main body portion 72 and spaced outwardly from the main body portion 72 a distance corresponding substantially to the depth of the ribs 80 so that the outer surface of the ribs 80 and leg 98 lie in substantially the same plane. The leg 98 has a substantially planar configuration with an inwardly extending flange 100 at an outer end of the leg 98. In one embodiment, the length of the mounting bracket 70 between the top flange 86 and the flange 100 corresponds substantially to the depth of a standard wall construction which is typically about 3.5 inches. The mounting bracket 70 has a length that can extend from the inner surface of the wall panel to the surface of the opposing wall panel as shown in FIG. 14 so that the bracket can support the free end of the electrical box.

Leg 98 as shown in FIG. 5 has an inwardly extending detent 102 that can be cut or embossed in the leg. The detent 102 has an axial length corresponding substantially to the width of the flange 96 to contact the surface of the end wall 20 of the electrical box when the mounting bracket 70 is attached to the end wall 20. The detent 102 contacts the side of the electrical box to prevent the leg 98 of the mounting bracket 70 from deflecting inwardly toward the electrical box.

Figure 15:
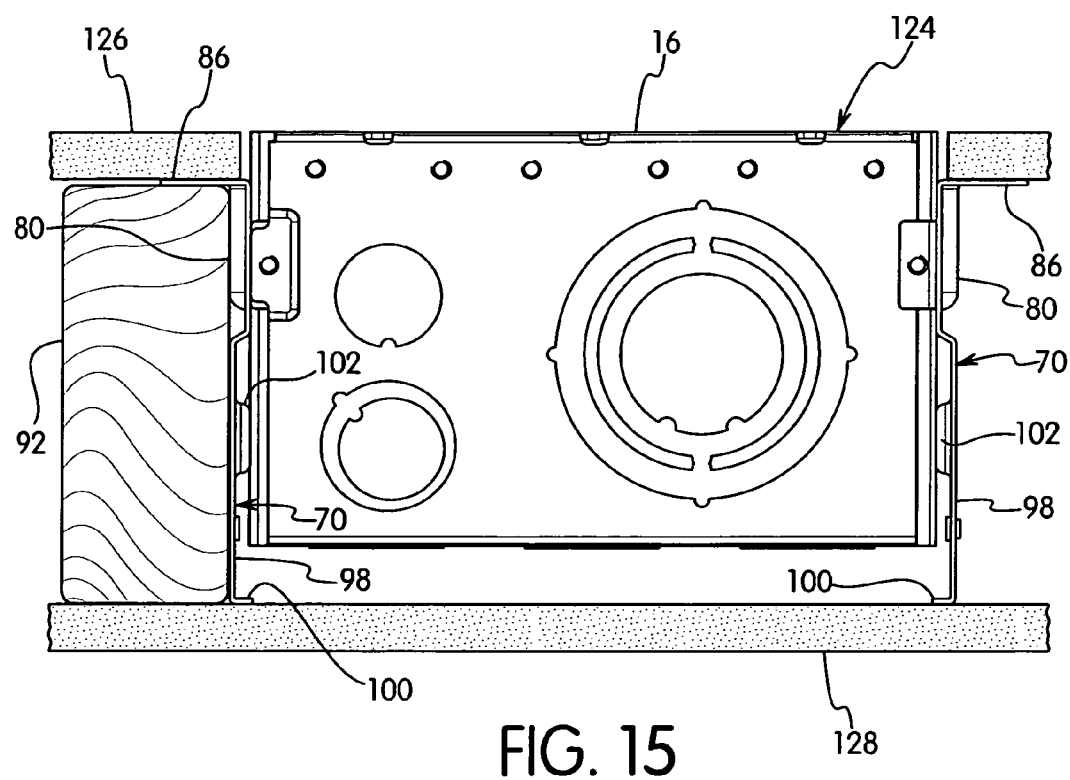
FIG. 15 is a side view of the assembly of FIG. 14.
Figure 16:
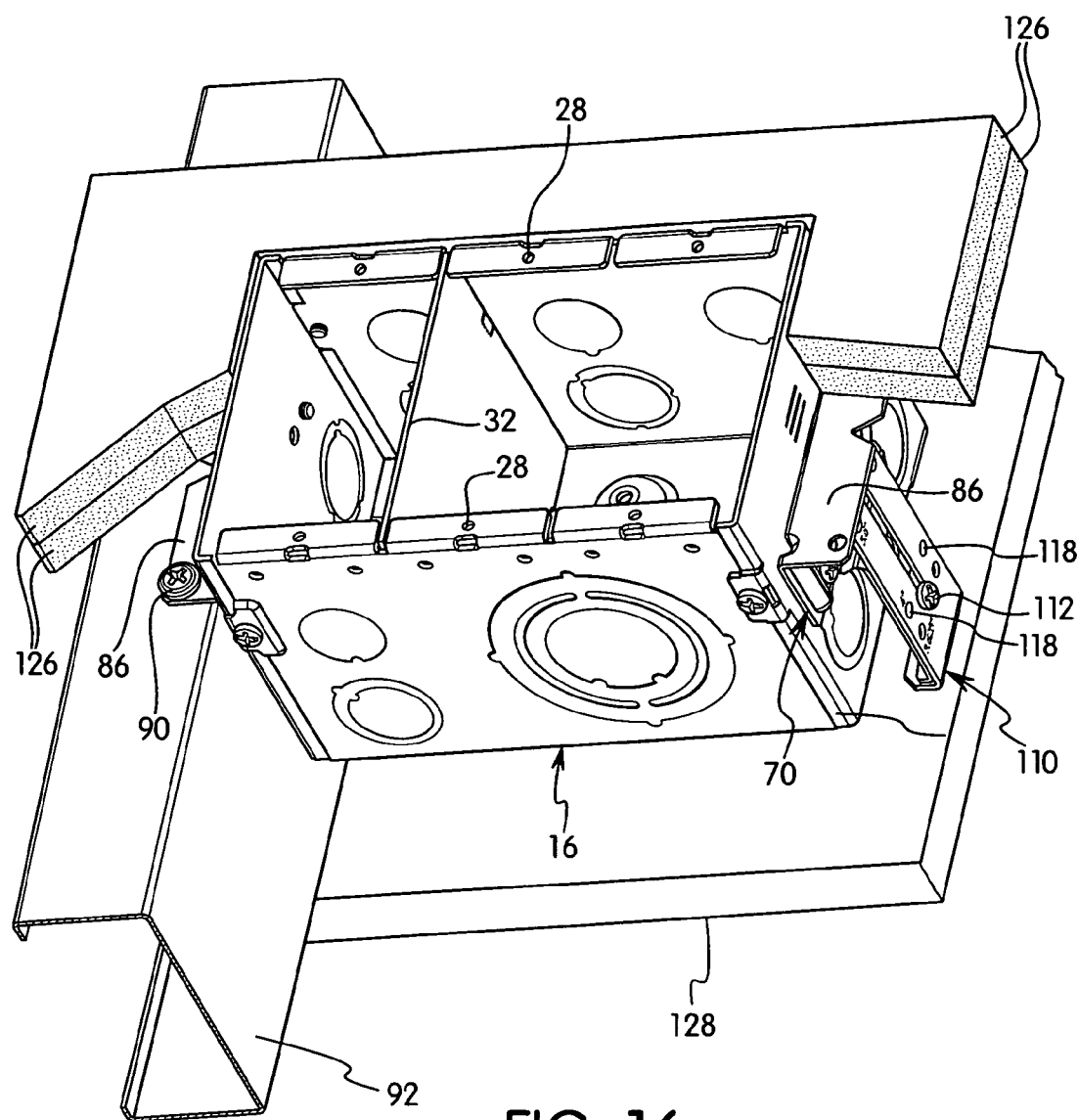
FIG. 16 is a perspective view of the electrical box attached to a wall stud with the box adjusted flush with the wall surface.

A removable support member 110 is coupled to the leg 98 by a screw 112. The screw 112 extends through a longitudinal slot 114 for adjusting the position of the support member 110 with respect to the mounting bracket 70. The screw 112 is received within an aperture 116 in the leg 98 as shown in FIG. 5. The leg 98 is preferably spaced from the plane of the body portion 72 a distance so that the screw 112 does not interfere with the end wall of the electrical box when the screw 112 is threaded into the leg 98. Adjacent the aperture 116 is a pair of detents 118 that extend outwardly for engaging the support member 110. As shown in FIG. 7, the support member has a longitudinal body with a plurality of spaced apart apertures 120 for mating with the respective detents 118. The apertures 120 are positioned along the length of the support member at selected locations to select the position of the support member with respect to the mounting bracket 70 to accommodate the depth of the wall cavity as determined by the dimensions of the support structure such as the wall stud. The support member 110 can include indicia 122 adjacent the apertures 120 to indicate the length of the mounting bracket 70 with the extended support member 110. Preferably, the end of support member 110 has an inwardly extending tab 123 for contacting the wall surface as shown in FIGS. 15 and 18.

During use, the electrical box assembly 10 is assembled with an electrical box 16 and a mounting bracket 70 as shown in FIG. 14. The mounting bracket 70 is adjusted on the end wall 20 by the adjustment screws 76 to position the open top end 124 of the electrical box a selected distance from the top flange 26. In the embodiment shown in FIG. 14, the mounting bracket 70 is positioned on the end wall 20 so that the open top end 124 is spaced from the top flange 26 a distance corresponding to the thickness of the wall panel 126. Alternatively, the mounting bracket can be positioned with respect to the end wall so that the open top end is recessed from the outer surface of the wall panel 126 or can extend outwardly from the wall panel as desired. The mounting bracket 70 is attached to the wall stud 92 by the screws 90 without the use of the support member 110. The support member 110 can be provided with the electrical box assembly and removed from the mounting bracket 70 before mounting to the wall stud 92.

The opposing end wall forming the free end of the electrical box spaced from the wall stud also includes a mounting bracket 70. In the embodiment shown in FIG. 14, the mounting bracket 70 has a length corresponding substantially to the dimension of the wall stud 92 so that the support member is not used and can be removed from the mounting bracket. The mounting bracket 70 is adjusted with respect to the end wall 20 by the adjustment screws 76 so that the top flange 26 contacts the inner surface of the wall panel 126. The mounting bracket 70 as shown has a length to extend between the front wall panel 126 and the opposing back wall 128. The position of the mounting bracket and the electrical box can be adjusted depending on the depth of the wall cavity and the thickness of the wall panel. As shown in FIG. 15, two layers of the wall panel 126 can be attached to the stud 92. The position of the mounting bracket 70 with respect to the open top end 124 can be selected so that the open top end remains flush with the outermost surface of the wall panel. In this embodiment, the support member 110 is attached to the mounting bracket in the retracted position and extends to contact the surface of the opposing wall 128 to support the end of the electrical box and prevent deflection and movement of the electrical box and prevent bending of the mounting bracket attached to the wall stud.

Figure 17:
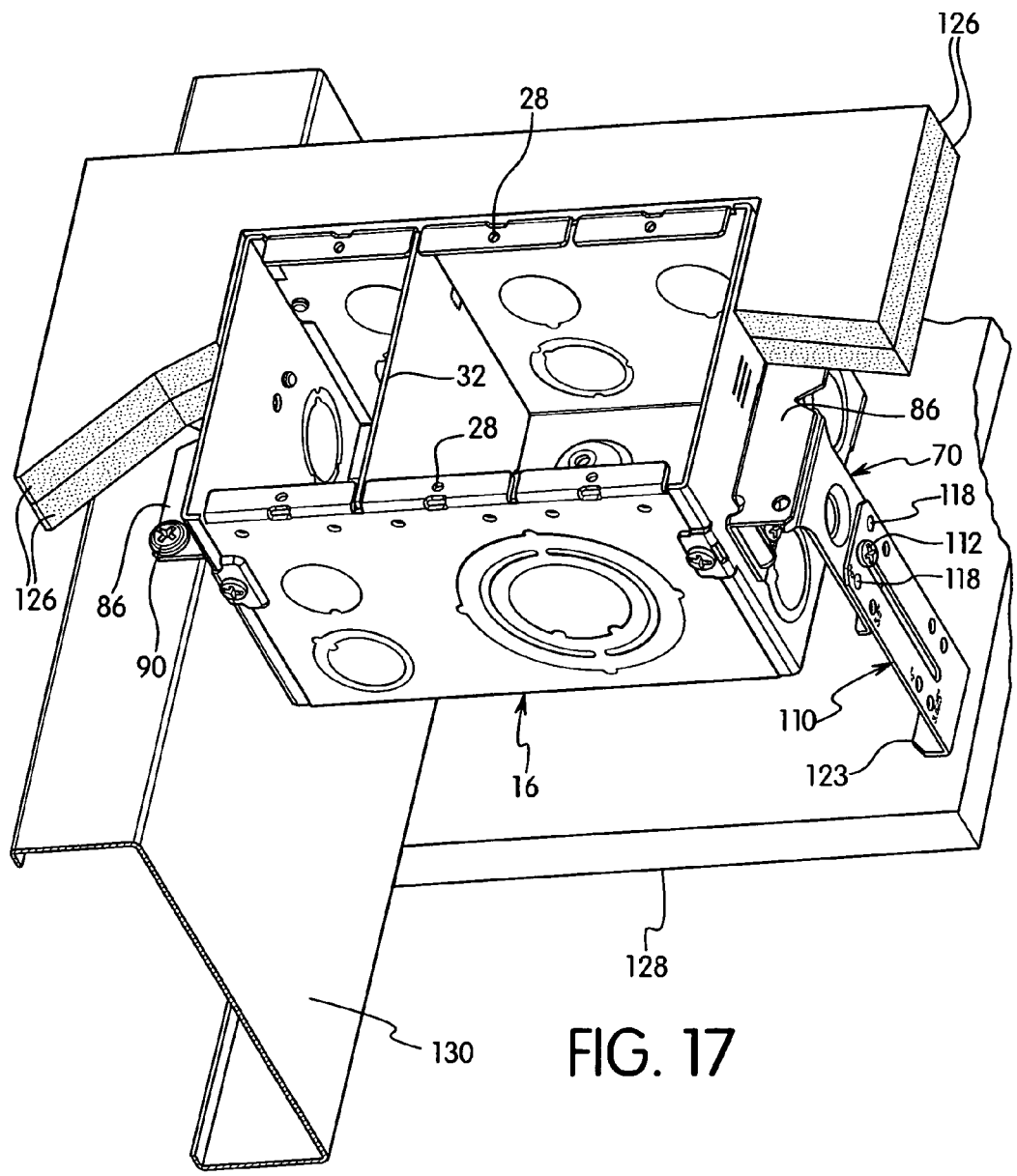
FIG. 17 is a perspective view of the electrical box attached to a wall stud with the support member extending to the opposing wall.
Figure 18:
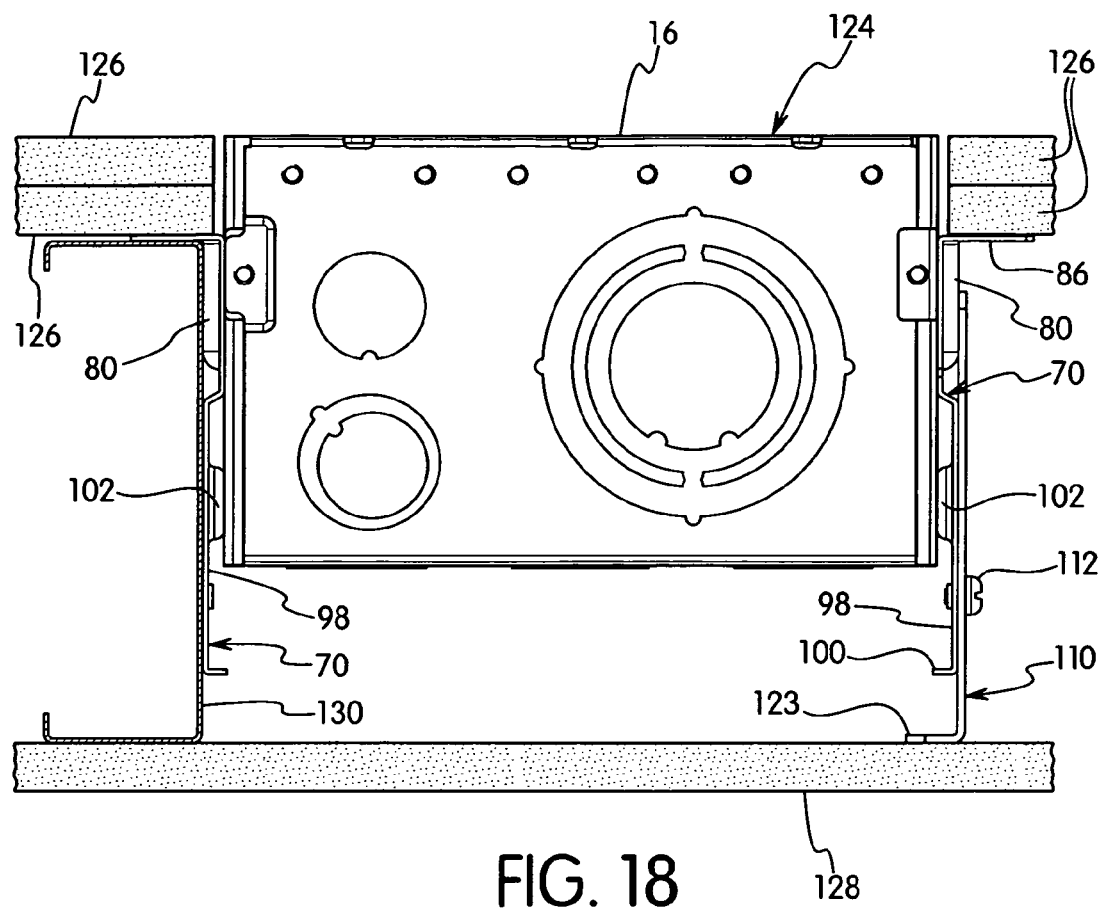
FIG. 18 is a side view of the assembly of FIG. 17.

In another embodiment shown in FIGS. 17 and 18, the mounting bracket is able to accommodate a six inch wall stud 130. The mounting bracket 70 is coupled to the end wall of the electrical box and attached directly to the wall stud 130. The mounting bracket and support member on the free end of the electrical box extend between the inner surface of the wall panel to the opposing wall panel 128 to support the end of the electrical box. As shown in FIGS. 17 and 18, the support member 110 is adjusted to extend from the mounting bracket 70 a selected distance to support the end of the electrical box opposite the wall stud 130.

While various embodiments have been chosen to illustrate the invention, it will be understood by those skilled in the art that various changes and modifications can be made without departing from the scope of the invention as defined in the appended claims.

What is claimed is:

1. An electrical box assembly comprising:
a first electrical box having a rear wall, opposing side walls, and a removable end wall coupled to an end of said electrical box, each of said opposing side walls having an inwardly extending flange for supporting an electrical device; and
a second electrical box having a rear wall, opposing side walls, and a removable end wall coupled to an end of said second electrical box, each of said opposing side walls having an inwardly extending flange for supporting an electrical device;
said second electrical box coupled to said first electrical box to form said electrical box assembly, where said flanges of said first electrical box and flanges of said second electrical box are spaced apart a distance to define a slot between the respective flanges; and
a partition plate positioned in said slot between said flanges of said first electrical box and said second electrical box;
said opposing side walls of said first electrical box and said second electrical box each have a coupling tab receiving a coupling screw coupling said electrical boxes together; and
said partition plate has opposite side edges, each side edge having a removable tab oriented with respect to said coupling screw of the opposing side walls of said electrical boxes which can be removed to avoid interference with said coupling screws.

2. The electrical box assembly of claim 1, further comprising
a mounting bracket coupled to one of said end walls of said electrical box assembly, said mounting bracket being adjustable with respect to an open top end of said electrical box assembly, said mounting flange having a top end with a first outwardly extending flange for mounting to a support and positioning said electrical box assembly with respect to a first wall and a bottom end with a flange for contacting the surface of a second wall to support said electrical box assembly.

3. The electrical box assembly of claim 2, wherein
said mounting bracket includes a longitudinally extending slot adapted for receiving a coupling screw for adjusting the position of the mounting bracket with respect to said end wall of said electrical box assembly.

4. The electrical box assembly of claim 3, wherein
said mounting bracket includes a plurality of spaced-apart apertures for receiving a detent extending from said end wall to position said mounting bracket in selected positions with respect to said end wall.

5. The electrical box assembly of claim 2, further comprising
a support member coupled to said mounting bracket, said support member being adjustable with respect to said mounting bracket.

6. The electrical box assembly of claim 5, wherein
said support member has a distal end with a tab adapted for contacting said second wall to support said electrical box assembly.

7. The electrical box assembly of claim 5, wherein
said mounting bracket includes a body portion coupled to said end wall of said electrical box assembly, and a longitudinally extending leg extending from said body portion and being spaced from a plane of said body portion, and where said support is coupled to and slidably adjustable with respect to said leg.

8. The electrical box assembly of claim 7, wherein
said leg includes a detent to contact said end wall of said electrical box assembly and space said leg from said end wall.

9. The electrical box assembly of claim 8, wherein
said leg includes a longitudinal slot adapted for receiving a screw extending through said leg for adjusting the position of said support member with respect to said mounting bracket, and where said leg is spaced from said end wall a distance to prevent interference of said screw with said end wall.

10. The electrical box assembly of claim 1, wherein
said rear wall of said first electrical box has an offset tab for overlapping and mating with said rear wall of said second electrical box; and
said partition plate has a bottom edge with a central recess for receiving said offset tab, and a coupling tab for coupling said partition plate to said rear wall of said first electrical box.

11. An electrical box assembly comprising:
a gangable electrical box having a rear wall, opposing side walls and opposing end walls, said opposing side walls having an inwardly extending flange adapted for supporting an electrical device;
a mounting bracket having a body portion coupled to said electrical box, said mounting bracket having a flange extending outward substantially perpendicular from a top end of said body portion and configured for mounting to a support and positioning said electrical box with respect to a first wall panel, and a leg extending a distance to contact a second wall panel when said second wall panel is spaced a first distance from said first wall panel; and
a removable support member coupled to said leg and being slidably adjustable with respect to said leg and said mounting bracket to contact said second wall panel when said second wall panel is spaced a second distance from said first wall panel.

12. The electrical box assembly of claim 11, wherein
said leg extends substantially parallel to said body portion and spaced outwardly from a plane of said body portion by a flange, and where said leg has an outer end with a flange for contacting the second wall spaced from the first wall the first distance.

13. The electrical box assembly of claim 12, wherein
said leg is spaced outwardly from said electrical box.

14. The electrical box assembly of claim 13, wherein
said support member is coupled to said leg by a fastener and where said leg is spaced from said electrical box a distance to prevent interference of said fastener with said electrical box.

15. The electrical box assembly of claim 14, wherein
one of said support member or said leg further comprises at least one detent, and the other of said support member and leg has at least one aperture for receiving said detent to position said support member in a selected position with respect to said leg.

16. The electrical box assembly of claim 15, wherein
said support member includes a longitudinally extending slot receiving a coupling screw received in a threaded aperture in said leg.

17. The electrical box assembly of claim 14, further comprising
a plurality of said detents on said leg for mating with a complementing aperture in said support member to position said support member at selected positions with respect to said mounting bracket.

18. The electrical box assembly of claim 13, wherein
said leg includes a detent for contacting said electrical box to space said leg outwardly from said electrical box.

19. The electrical box assembly of claim 11, wherein
said mounting bracket is adjustable with respect to said electrical box to position said electrical box at a selected position with respect to said first wall panel.

20. The electrical box assembly of claim 19, wherein
said body of said mounting bracket includes an elongated slot receiving a screw threaded into said electrical box for selectively positioning said mounting bracket on said electrical box, and
said body portion having a plurality of spaced apart apertures for receiving a detent on said electrical box to position said mounting bracket in selected locations.

21. The electrical box assembly of claim 20, wherein
said leg includes at least one outwardly extending detent, and
said support member includes a plurality of apertures for mating with said at least one detent to selectively position said support member with respect to said mounting bracket.

22. An electrical box assembly comprising:
an electrical box including a rear wall, opposing side walls and opposing first and second end walls;
a first mounting bracket having a body portion coupled to said first end wall, a second mounting bracket having a body portion coupled to said second end wall, each said mounting bracket having a leg, and a flange extending substantially perpendicular from a top end of said body portion and being configured for mounting to a support, each mounting bracket being independently adjustable with respect to said respective end wall to position said electrical box in a selected position with respect to the support, said leg having a length for contacting a first wall panel spaced a first distance from said flange; and
at least one support member coupled to said leg of said first mounting bracket coupled to said first end wall, said support member being slidably adjustable with respect to said first mounting bracket coupled to said first end wall to extend from said first mounting bracket a distance to contact a second wall panel spaced a second distance from said flange to support said electrical box.

23. The electrical box assembly of claim 22, wherein
said flange of said first mounting bracket has a dimension for attaching to a support member, and
said flange of said second mounting bracket has a dimension for contacting and supporting an inner face of a third wall panel, said support member being coupled to said second mounting member and being extendable with respect to said second mounting member to contact the wall panel spaced the second distance from the flange.

24. The electrical box assembly of claim 22, wherein
said first mounting bracket is adapted for mounting to a support member to support the electrical box, and to position an open top end of said electrical box a selected distance from the support member.

25. The electrical box assembly of claim 22, wherein
said body portion of said first mounting bracket includes a longitudinal slot receiving a screw threaded into an aperture in said side, and a plurality of spaced apart apertures for receiving a detent extending from the respective end wall, to locate the first mounting member in a selected position with respect to said electrical box.

26. The electrical box assembly of claim 25, wherein
said leg of said first mounting bracket has at least one outwardly extending detent and said support member has a plurality of spaced apart recesses for receiving said at least one detent.

27. The electrical box assembly of claim 26, wherein
said leg of said first mounting bracket has an inwardly extending detent to space said leg from the respective end wall.

* * * * *